United States Patent [19]

Kanda et al.

[11] Patent Number: 6,013,377
[45] Date of Patent: *Jan. 11, 2000

[54] SURFACE-TREATED METAL MATERIAL AND METAL SURFACE TREATMENT METHOD

[75] Inventors: Tomoyuki Kanda, Kamakura; Atsuhiko Tounaka; Yasuhiro Shibata, both of Yokohama; Toshiaki Shimakura, Ichikawa; Kiyotada Yasuhara, Kashiwa, all of Japan

[73] Assignee: Nippon Paint Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/870,140

[22] Filed: Jun. 5, 1997

[30] Foreign Application Priority Data

Jun. 13, 1996 [JP] Japan ..................................... 8-152237

[51] Int. Cl.[7] ........................................................ B32B 9/00
[52] U.S. Cl. ........................ 428/472.3; 148/251; 148/260; 148/273; 106/14.12; 106/14.15
[58] Field of Search ..................................... 148/247, 250, 148/251, 273, 260; 106/14.12, 14.15; 252/389.2; 428/458, 472.3, 626

[56] References Cited

U.S. PATENT DOCUMENTS

| | | | |
|---|---|---|---|
| 4,130,524 | 12/1978 | Boerwinkle et al. | ................ 106/14.12 |
| 4,511,404 | 4/1985 | Drake et al. | ......................... 106/14.12 |
| 4,705,703 | 11/1987 | Meier et al. | . |
| 4,954,372 | 9/1990 | Sako et al. | ........................... 427/388.2 |
| 4,978,399 | 12/1990 | Kodama et al. | ........................ 148/250 |
| 5,246,507 | 9/1993 | Kodama et al. | ........................ 148/250 |
| 5,370,909 | 12/1994 | Tanaka et al. | ....................... 252/389.2 |

FOREIGN PATENT DOCUMENTS

| | | |
|---|---|---|
| 39 00 149 | 7/1989 | Germany . |
| A 7-278836 | 10/1995 | Japan . |
| a 7-278410 | 10/1995 | Japan . |
| WO 90/12902 | 11/1990 | WIPO . |
| WO 93/09265 | 5/1993 | WIPO . |
| WO 95/04169 | 2/1995 | WIPO . |
| WO 95/25831 | 9/1995 | WIPO . |
| WO 95/28449 | 10/1995 | WIPO . |
| WO 95/28509 | 10/1995 | WIPO . |
| WO 95/33869 | 12/1995 | WIPO . |
| wo 96/07772 | 3/1996 | WIPO . |
| WO 97/13887 | 4/1997 | WIPO . |

*Primary Examiner*—John Sheehan
*Assistant Examiner*—Andrew L. Oltmans
*Attorney, Agent, or Firm*—Oliff & Berridge, PLC

[57] ABSTRACT

A surface-treated metal material wherein a film comprising an organic polymer compound having 5–100 mg of carbon per $m^2$ and a phosphoric acid compound having 1–30 mg of phosphorus per $m^2$ is formed on a metal surface, the ratio C/P of carbon atoms C to phosphorus atoms P in the film lying within the range 2–25.

8 Claims, No Drawings

SURFACE-TREATED METAL MATERIAL AND METAL SURFACE TREATMENT METHOD

BACKGROUND OF THE INVENTION

This invention relates to a surface-treated metal material and metal surface treatment method and, in particular, to a surface-treated metal material and surface treatment method offering improved coating adhesion and improved nonstick and anticorrosion properties.

DESCRIPTION OF THE RELATED ARTS

A typical metal surface treatment, which for example is used in the manufacture of aluminum cans, comprises DI (Drawing and Ironing), removal of smut with an acidic cleaner, rinsing with water, and chemical-conversion treatment. This chemical-conversion treatment has the objective of improving anticorrosion and nonstick properties and coating adhesion. The chemical-conversion treatment may be a chromate treatment or a non-chromate treatment, but, in recent years, non-chromate treatment has grown more common as a result of efforts to avoid environmental pollution. Examples of non-chromate treatment agents are the widely used zirconium phosphate type. Normally in the manufacture of aluminum cans, after chemical-conversion treatment, the cans are thoroughly rinsed with water, dried in an oven, and then printed and coated. In the transition to the printing and coating steps, the width of the belt conveyor on which the cans are transported suddenly narrows. The cans may then touch each other and come into contact with the belt conveyor guides leading to jamming (defective transport), so that can transport speed decreases and production efficiency falls.

In general, when the metal is treated by the aforesaid zirconium phosphate type agents, a zirconium oxide or zirconium phosphate film is formed on the aluminum surface and, when this film reaches a certain thickness, lumping occurs which tends to make the coating adhesion defective. Further as this inorganic film does not eliminate surface stick, jamming occurs when the cans are transported on a belt conveyor and there is a risk that production may decline.

In recent years therefore, agents have been proposed which form organic films in addition to those which form inorganic films. For example in "Metal Surface Treatment Polymer Compositions and Treatment Methods" disclosed in Japanese Patent Laid-open Publication No. Hei 7-278410, an agent is proposed which forms a phenolic resin type organic film in addition to an inorganic film. This agent comprises an acidic compound and a polymer having the following formula (I) (where X=H, C1–C5 alkyl, C1–C5 hydroxyalkyl, or a group having the following formula (II), $R^1$, $R^2$=H, OH, C1–C10 alkyl or C1–C10 hydroxyalkyl, $y^1$, $y^2$=H or a group z having the following formula (III) or (IV), $R^3$–$R^7$=C1–C10 alkyl or C1–C10 hydroxyalkyl, the average number of substituent groups Z in each benzene ring of the polymer molecule=0.2–1.0, and n=5–50), and, according to the disclosed method, the agent which has a pH of 2.0–6.5 is brought in contact with a metal surface. The metal surface treatment agent described in the above Japanese Patent Laid-open Publication No. Hei 7-278410 comprises 0.01–20 g/l of a phenolic type resin and 0.1–30 g/l of phosphoric acid.

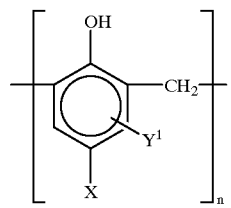

(I)

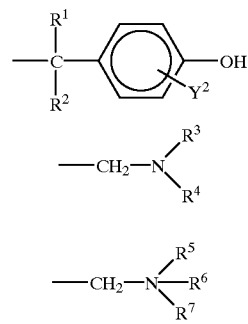

(II)

(III)

(IV)

In "Aluminum-Containing Metal Surface Treatment Composition and Surface Treatment Method" disclosed in Japanese Patent Laid-open Publication No. Hei 7-278836, a treatment agent is proposed which forms both an inorganic film and a bis-phenol A type resin organic film. This agent comprises phosphoric acid ion, condensed phosphoric acid ion, and a water-soluble polymer in a weight blending proportion of 1–30:0.1–10:0.2–20. According to the proposed method, an agent having a pH of 2.0–6.5 is brought in contact with a metal surface at a temperature of 30–65° C. for 5–60 seconds, then the surface is rinsed with water and dried by heating. The aforesaid water-soluble polymer has the following chemical structure (V). In the formula (V), $y^1$, $y^2$ are H or a group Z having the following formula (VI) or (VII), and the average number of substituent groups Z in the benzene ring polymer molecule is 0.2–1.0. Further, the metal surface treatment agent described in this publication comprises 0.1–20 g/l of a bis-phenol A type resin, 1–30 g/l of phosphoric acid ion and 0.1–10 g/l of condensed phosphoric acid ion.

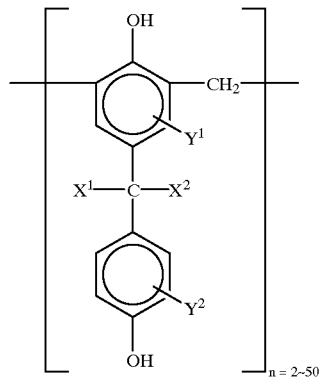

(V)

-continued

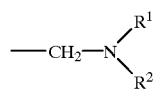 (VI)

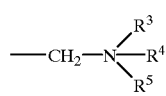 (VII)

Although the film formed on a metal surface by the surface treatment agent disclosed in the above Japanese Patent Laid-open Publication No. Hei 7-278410 has satisfactory coating adhesion, the phenolic resin is highly hydrophilic, and the film therefore has slightly poorer nonstick properties. In the case of the film formed on a metal surface by the surface treatment agent disclosed in the above Japanese Patent Laid-open Publication No. Hei 7-278836 containing bis-phenol A type resin, the bis-phenol A type resin is highly hydrophilic, so this film has slightly poorer nonstick properties and also poor anticorrosion properties. When nonstick properties are poor, jamming occurs with aluminum DI cans. Poor lubrication was obtained when surface treatment agents were used for coil coating of steel sheet or the like.

SUMMARY OF THE INVENTION

This invention, which was conceived in view of the above problems, therefore aims to provide a surface-treated metal material having improved nonstick, coating adhesion, and anticorrosion properties (in the case of DI cans, resistance to blackening by boiling water), and to provide a surface treatment method for producing such a metal material.

To achieve the aforesaid objectives, in the surface-treated metal material according to this invention, a film comprising an organic polymer compound in a ratio of 5–100 mg/m$^2$ in terms of carbon and a phosphoric acid compound having 1–30 mg of phosphorus per m$^2$ is formed on a metal surface. In metals which have received an alternative surface treatment according to this invention, a film comprising an organic polymer compound having 5–100 mg of carbon per m$^2$ and a phosphoric acid compound having 1–30 mg of phosphorus per m$^2$ is formed on a metal surface and, in addition, the ratio C/P of carbon C [mg/m$^2$] to phosphorus P [mg/m$^2$] in the film lies within the range 2–25. By increasing the ratio C/P in the film formed on the metal surface within the prescribed range, the anticorrosion properties of the film (in the case of aluminum DI cans, the resistance to blackening by boiling water) are improved. Further, as anticorrosion requirements can be satisfied using a small amount of film by increasing the ratio C/P in the film, the machine working properties of the metal can be improved. The hydrophobic nature of the film is moreover enhanced by increasing the ratio C/P in the film so that nonstick is improved, and jamming can therefore be suppressed.

In the metal surface treatment method according to this invention, an agent comprising at least an organic polymer compound and phosphoric acid is brought in contact with a metal surface so as to form a film comprising an organic polymer compound having 5–100 mg of carbon per m$^2$ and a phosphoric acid compound having 1–30 mg of phosphorus per m$^2$, or a film comprising an organic polymer compound having 5–100 mg of carbon per m$^2$ and a phosphoric acid compound having 1–30 mg of phosphorus per m$^2$ wherein, in addition, the ratio C/P of carbon atoms C to phosphorus atoms P lies within the range 2–25. As the ratio C/P in the film formed on the metal surface is high, the anticorrosion properties of the film (resistance to blackening by boiling water in the case of aluminum DI cans) are improved and, since anticorrosion requirements may be satisfied using a small amount of film, the machine working properties of the metal can be improved. By increasing the ratio C/P in the film, the hydrophobic nature of the film formed on the metal surface is enhanced, so nonstick properties are improved and jamming may be suppressed. Moreover, by varying the weight ratio C/P and film thickness, the external appearance, i.e. the color tone of the film, may be controlled.

In metals which have been surface-treated according to this invention, a film comprising an organic polymer compound having 5–100 mg of carbon per m$^2$ and a phosphoric acid compound having 1–30 mg of phosphorus per m$^2$ is formed on a metal surface. In metals which have received an alternative surface treatment according to this invention, a film comprising an organic polymer compound having 5–100 mg of carbon per m$^2$ and a phosphoric acid compound having 1–30 mg of phosphorus per m$^2$ is formed on a metal surface, and, in addition, the ratio C/P of carbon atoms C to phosphorus atoms P in the film lies within the range 2–25, and preferably within the range 2–10. When Carbon (C) of the organic polymer compound is less than 5 mg/m$^2$, the film becomes thinner and its anticorrosion properties decrease. On the other hand, when C exceeds 100 mg/m$^2$, the film becomes thicker than necessary and coating adhesion is poor. When phosphorous (P) of the phosphoric acid compound is less than 1 mg/m$^2$, the film becomes thinner and its anticorrosion properties decrease. On the other hand, when P exceeds 30 mg/m$^2$ in terms of phosphorus atoms (P), the film becomes thicker than necessary, coating adhesion is poor, the permeability of the film to water increases, and its anticorrosion properties decrease.

When the ratio C/P of carbon C and phosphorus P in the film is less than 2, the amount of phosphorus in the film increases and anticorrosion properties decrease. On the other compound separates out in the metal surface treatment agent and a uniform film cannot be formed on the metal surface so that anticorrosion properties again decline.

Organic polymer compound

The organic polymer compound contained in the film according to this invention is a water-soluble, water-dispersible or emulsion type resin comprising at least one or more nitrogen atoms as expressed by the following formulae (a), (b), and is a compound having at least one type of resin skeleton chosen from the group epoxy resin, acrylic resin, urethane resin, phenol resin, olefin resin, or amide resin.

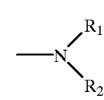 (a)

(where R$_1$, R$_2$ are hydrogen, hydroxyl, a substitutable straight-chain or branched alkyl group having 1–10 carbon atoms, or a substitutable straight-chain or branched alkanol group having 1–10 carbon atoms).

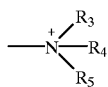

(b)

(where $R_3$, $R_4$, $R_5$ are hydrogen, hydroxyl, a substitutable straight-chain or branched alkyl group having 1–10 carbon atoms, or a substitutable straight-chain or branched alkanol group having 1–10 carbon atoms).

The amount of the aforesaid organic polymer compound relative to the metal surface treatment agent is preferably in the range 0.01–10 g/l, but more preferably in the range 0.1–5 g/l. When the amount of organic polymer compound is less than 0.01 g/l, the thickness of the organic resin film is insufficient and the barrier effect decreases so that anticorrosion properties decline. On the other hand, when the amount of organic polymer compound exceeds 10 g/l, the stability of the surface treatment agent decreases and cost increases, which is not economical. The metal surface treatment agent according to this invention may, if necessary, additionally comprise the following inorganic acids, heavy metals, etching agents, etching additives, polyvalent anions, aluminum ions, or oxidizing agents.

Inorganic Acids

Examples of inorganic acids that may be used include phosphoric acid and nitric acid, though phosphoric acid is preferable. Salts of these acids may also be used, the sodium, potassium, or magnesium salts being preferred. Phosphoric acid renders the aqueous solution acidic so as to dissolve the aforesaid organic polymer compound, and it is also used for etching the metal surface. The concentration of this phosphoric acid is preferably in the range 0.01–10 g/l, but more preferably in the range 0.25–5 g/l relative to metal surface treatment agent. When the amount of phosphoric acid is less than 0.01 g/l, the acidity is insufficient so that the organic polymer compound is not easily soluble. On the other hand, when the amount of phosphoric acid exceeds 10 g/l, the tendency of the resin film to deposit during surface treatment is suppressed so that anticorrosion properties are impaired.

Heavy Metals

The surface treatment agent according to this invention may also comprise heavy metals. This heavy metal may be one or more metal chosen from the group Zr, Nb, Ni, Co, Mn, Ti, Ta, Mo, or W. Complex fluorides of these metals are preferable, but nitrates and phosphates may also be used. It is preferred that the amount of heavy metal be less than 10 g/l relative to metal surface treatment agent. When the amount of heavy metal exceeds 10 g/l, anticorrosion properties, coating adhesion and nonstick properties decline.

Etching Agents

Examples of etching agents that can be used include hydrofluoric acid and its salts. The amount of etching agent is preferably in the range 0.005–5 g/l relative to metal surface treatment agent. When the amount of fluoride ion is less than 0.005 g/l, etching of the metal surface is inadequate, and, as the interface pH does not rise sufficiently, the resin film does not deposit smoothly on the metal surface so that anticorrosion properties are poor. On the other hand, when the amount of fluoride ion exceeds 5 g/l, etching progresses too far so that the resin film again does not deposit smoothly on the metal surface, anticorrosion properties are poor, and nonstick properties are inadequate.

Etching Additives

Examples of etching additives that may be used include fluorosilicic acid, fluoroboric acid, and their salts. The amount of etching additive is preferably in the range 0.003–5 g/l relative to metal surface treatment agent. When the amount of etching additive is less than 0.003 g/l, etching of the metal surface is inadequate, the resin film does not deposit smoothly on the metal surface, and anticorrosion properties are poor. On the other hand, when the amount of etching additive exceeds 5 g/l, etching progresses too far so that the resin film again does not deposit smoothly on the metal surface and anticorrosion and nonstick properties are poor.

Polyvalent Anions

Examples of polyvalent anions include condensed phosphoric acids (pyrophosphoric acid, metaphosphoric acid, hexametaphosphoric acid, tripolyphosphoric acid, tetraphosphoric acid), molybdenic acid, tungstenic acid, vanadic acid, phosphomolybdenic acid, phosphotungstenic acid, silicotungstenic acid, and their salts. The amount of polyvalent anion is preferably in the range 0.003–10 g/l relative to metal surface treatment agent. When the amount of polyvalent anion is less than 0.003 g/l, etching of the metal surface is inadequate, the resin film does not deposit smoothly on the metal surface, anticorrosion properties are poor, and nonstick properties decline. On the other hand, when the amount of polyvalent anion exceeds 10 g/l, the stability of the treatment solution decreases.

Aluminum Ions

Aluminum ions promote the deposition speed of the resin film (i.e. the film comprising the organic polymer compound), and have an effect of making the film finer and more uniform. The aluminum ions may be supplied in the form of aluminum nitrate, aluminum hydroxide, or aluminum fluoride, and, when the metal to be surface-treated is an aluminum alloy, they may be obtained by dissolution from etching. The amount of aluminum ions is preferably in the range 0.01–0.5 g/l, but more preferably in the range 0.05–0.2 g/l, relative to metal surface treatment agent. When the amount of aluminum ions is less than 0.01 g/l, the organic polymer compound does not deposit smoothly on the metal surface and anticorrosion properties are poor. On the other hand, when the amount of aluminum ions exceeds 0.5 g/l, the aforesaid organic polymer compound and an insoluble compound are formed in the treatment solution which gives rise to turbidity and produces sludge. External appearance is then impaired.

Oxidizing Agents

Oxidizing agents promote the deposition of the organic polymer compound on the metal surface (chemical stabilization of the metal surface), and also have the effect of making the resin film finer and more uniform. Examples of oxidizing agents are hydrogen peroxide, nitrous acid, salts of nitrous acid, perboric acid, salts of perboric acid, chloric acid, salts of chloric acid, and bromic acid and salts of bromic acid, but hydrogen peroxide and salts of nitrous acid are preferable. The amount of oxidizing agent is preferably in the range 0.01–10 g/l, but more preferably 0.1–2 g/l, relative to metal surface treatment agent. When the amount of oxidizing agent is less than 0.01 g/l, the above-mentioned oxidizing effect is insufficient and anticorrosion properties decline. On the other hand, when the amount of oxidizing agent exceeds 10 g/l, the effect of the oxidizing agent is weakened, which is uneconomical.

Treatment Conditions and Treatment Method

The pH of the aforesaid metal surface treatment agent is approximately in the range 2.0–5.0, but more preferably 2.5–4.0. pH adjustment may be made using NaOH, aqueous ammonia, or nitric acid. The contact temperature between the metal surface treatment agent of this invention and a metal surface is preferably in the range of ambient temperature (e.g. 20° C.)–90° C., but more preferably in the range 35–65° C. In general, the contact time between a metal and the metal surface treatment agent of this invention is shorter the higher the treatment temperature. In the case of spray coating on the metal surface, this time is in the range of approximately 5 seconds–5 minutes, but preferably in the range 10–60 seconds. When a dipping method is used, a longer contact time than the above contact time is required. The metal and agent may be brought in contact also by flow coating or roll coating.

As described above, the metal surface which has been chemical-conversion treated is rinsed with water and is then dried. The drying temperature is in the range 150–240° C., as anticorrosion properties decline when the drying temperature is less than 150° C.

The mechanism whereby the organic polymer compound deposits on the metal surface will now be described.

In the acidic aqueous solution, the nitrogen atom in the aforesaid organic polymer compound (from an amine) gives rise to a cationic nature. Due to a rise of metal interface pH when the metal is etched, this cationic nature is lost so that the organic polymer compound condenses and deposits on the metal surface. Deposition of resin on the metal occurs also due to sharing of a lone pair of electrons on the nitrogen atom with the metal (chelation). In addition to aluminum and aluminum alloys, other metals which may be used in the metal surface treatment method of this invention are iron, zinc, zinc alloys, tinplate, and stainless steel.

DESCRIPTION OF ACTUAL EXAMPLES

Next, this invention will be described in further detail with reference to specific and comparative examples, though it is to understood that the invention is not to be limited by these examples in any way.

Examples 1–8 and comparative Examples 1–2

(1) Object to be treated:
Molded can obtained by DI working, etc., of Al—Mn (JIS-A3004) alloy sheet.
(2) Method of assessing film for undercoat
a) Carbon (C), phosphorus (P) and ratio C/P in film
   The amount of carbon in a film formed on the treated object was measured by a surface carbon moisture analyzer (LECO RC-412). The amount of phosphorus was measured using a fluorescing X-ray analyzer, and the ratio C/P was then computed.
Surface carbon moisture analyzer (LECO RC-412): Surface-treated steel plate was heated to 450° C., and the $CO_2$ produced by reacting organic substances with oxygen was detected by IR (infrared absorption spectrum).

b) Resistance to blackening by boiling water (anticorrosion properties)
   An object which had been surface-treated by the composition of this example and by comparative examples was immersed in boiling tap water for 30 minutes, and its external appearance was evaluated according to the following criteria:
   ○: no change in external appearance
   Δ: slight blackening
   x: extensive blackening
c) Slip properties of undercoat film surface
   The dynamic frictional coefficient of an object which had been chemical-conversion treated by the method of this example was measured by a HEIDON-14 tester using 5 mm dia., 50 g steel balls and sensing pin rate of 300 mm/min.
   ○: less than 0.6
   Δ: 0.6–0.8
   x: higher than 0.8
d) Coating adhesion
   A BASF paint (base paint EB-70-001N, 150 mmg/m$^2$, clear EB-69-002N, 60 mmg/m$^2$) was applied to the object to be treated by a bar coater. This coated object was then subjected to wedge bending, and paint peeling of the bent part was evaluated according to the following criteria when was tape (Nichiban brand cellotape) applied.
   ○: paint peeling width less than 15 mm
   Δ: paint peeling width 15–20 mm
   x: paint peeling width greater than 20 mm
(3) Metal surface treatment conditions Example 1

An Al—Mn (JIS-A3004) molded can was subjected to spray degreasing by an acidic degreasing agent ("Surf Cleaner NHC250", Nippon Paint Co., Ltd.) at a concentration of 30 g/l and a temperature of 75° C. for 60 seconds, and then rinsed with water. The can was then chemical-conversion spray treated by a metal surface treatment agent comprising 0.5 g/l phosphoric acid, 0.5 g/l hydrofluoric acid, 1.0 g/l of a nitrogen atom-containing acrylic resin as organic polymer compound and 0.5 g/l hydrogen peroxide as oxidizing agent, the pH of this agent having been adjusted to 3.5, at a temperature of 50° C. for 20 seconds. After treatment, the can was rinsed with water and dried at 190° C. for 3 minutes. The test results are shown in Table 1.

Examples 2–8, Comparative Examples 1–2

As shown in Table 1, a surface treatment was performed based on the above Example 1 varying the type and amount of the aforesaid organic polymer compound, and varying the amounts of phosphoric acid, hydrofluoric acid and hydrogen peroxide, the amounts of other components being the same as those of Example 1. The results are shown in Table 1.

TABLE 1

| | Composition of Surface Treatment Agent | | | | | Test Results | | | | | | |
|---|---|---|---|---|---|---|---|---|---|---|---|---|
| | Organic polymer compound | | Phosphoric acid (g/l) | Hydrofluoric acid (g/l) | $H_2O_2$ (g/l) | C in film (mg/m²) | P in film (mg/m²) | Ratio C/P in film | Resistance to blackening by boiling water | Nonstick property | Coating adhesion | Appearance of Object |
| | Species | Concentration (g/l) | | | | | | | | | | |
| Example | | | | | | | | | | | | |
| 1 | (A) | 1.0 | 0.5 | 0.5 | 0.1 | 23 | 3.5 | 6.6 | ○ | ○ | ○ | colorless |
| 2 | (A) | 2.0 | 0.5 | 1 | 0.1 | 28 | 3.1 | 9.0 | ○ | ○ | ○ | colorless |
| 3 | (A) | 1.0 | 3 | 1 | 1 | 18 | 7.5 | 2.4 | ○ | ○ | ○ | colorless |
| 4 | (B) | 1.0 | 0.5 | 0.5 | 0.1 | 21 | 4.2 | 5.0 | ○ | ○ | ○ | colorless |
| 5 | (C) | 1.0 | 0.5 | 0.5 | 0.1 | 22 | 4.1 | 5.4 | ○ | ○ | ○ | colorless |
| 6 | (D) | 1.0 | 0.5 | 0.5 | 0.1 | 20 | 3.9 | 5.1 | ○ | ○ | ○ | colorless |
| 7 | (A) | 1.0 | 0.5 | 1.5 | 1.5 | 40 | 11.3 | 3.5 | ○ | ○ | ○ | yellow |
| 8 | (A) | 1.0 | 0.5 | 1.5 | 2.0 | 60 | 24.0 | 2.5 | ○ | ○ | ○ | purple |
| Comparative Example | | | | | | | | | | | | |
| 1 | (A) | 0.5 | 0.09 | 0.04 | 0.01 | 2 | 1.4 | 1.4 | X | X | Δ | colorless |
| 2 | (A) | 15 | 6 | 2.5 | 12 | 3.4 | 3.2 | 1.1 | X | X | X | colorless |

N.B.

(A) phenolic resin: shown by (c) below
(B) polyvinylphenol resin: shown by (d) below
(C) bisphenol A resin: shown by (e) below
(D) amino-modified cationic resin
HEA*¹/p-TBS*²/DMAEA*³=40/30/30, molecular weight 3000
*1 HEA: hydroxyethylacrylate
*2 p-TBS, para-t-butylstyrene
*3 N-dimethylaminoethylacrylate

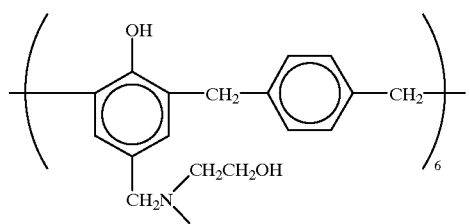

(c)

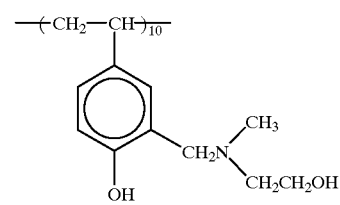

(d)

(e)

From these results, it was found that in the surface-treated metal material and metal surface treatment method according to this invention, anticorrosion properties (resistance to blackening by boiling water), nonstick properties, and coating adhesion were all improved compared to the related art. Further, by controlling the film amount and C/P, it was possible to vary the color tone of the film, and obtain a film of pleasing aesthetic appearance (design sense).

Hence, in the surface-treated metal material and metal surface treatment method according to this invention, by increasing the ratio C/P in the film formed on the metal surface, anticorrosion properties (resistance to blackening by boiling water in the case of an aluminum DI can) are improved. Further, by increasing the ratio C/P in the film, anticorrosion requirements can be satisfied with a small film amount and machine working properties of the metal are improved. Still further, by increasing the ratio C/P in the film, the hydrophobic nature of the film is enhanced and nonstick properties are improved. Jamming can therefore be suppressed.

What is claimed:

1. A surface-treated metal material wherein a film is formed on a metal surface comprising:

an organic polymer compound containing 5–100 mg of carbon per m$^2$, and a phosphoric acid compound containing 1–30 mg of phosphorus per m$^2$.

2. A surface-treated metal material wherein a film is formed on a metal surface comprising:

an organic polymer compound containing 5–100 mg of carbon per m$^2$, and a phosphoric acid compound containing 1–30 mg of phosphorus per m$^2$, wherein the ratio C/P of said carbon and said phosphorus is in the range 2–25.

3. A surface-treated metal material wherein a film is formed on a metal surface comprising:

an organic polymer compound containing 5–100 mg of carbon per m$^2$, and a phosphoric acid compound containing 1–30 mg of phosphorus per m$^2$, wherein the ratio C/P of said carbon atoms and said phosphorus atoms is in the range 2–10.

4. A surface-treated metal material as defined in claim 1, wherein said phosphoric acid compound is at least one compound chosen from the group consisting of phosphoric acid and its sodium, potassium, and magnesium salts.

5. A surface-treated metal material as defined in claim 1, wherein said organic polymer compound is water-soluble, water-dispersible or takes the form of an emulsion, and is an organic polymer compound comprising at least one nitrogen atom or a salt of same.

6. A surface-treated metal material as defined in claims 5, wherein said organic polymer compound is a compound comprising at least one type of resin skeleton chosen from the group consisting of epoxy resin, acrylic resin, urethane resin, phenolic resin, olefin resin, and amide resin, and wherein at least one functional group in said organic polymer compound has either of the following formulas (a) or (b):

(a)

(where $R_1$, $R_2$ are hydrogen, hydroxyl, a substitutable straight-chain or branched alkyl group having 1–10 carbon atoms, or a substitutable straight-chain or branched alkanol group having 1–10 carbon atoms).

(b)

(where $R_3$, $R_4$, $R_5$ are hydrogen, hydroxyl, a substitutable straight-chain or branched alkyl group having 1–10 carbon atoms, or a substitutable straight-chain or branched alkanol group having 1–10 carbon atoms).

7. A surface-treated metal material as defined in claim 1 wherein said metal material is an aluminum can.

8. A metal surface treatment method, wherein a treatment agent comprising at least an organic polymer compound and a phosphoric acid compound is brought in contact with a metal surface, and a film as defined in claim 1 is formed on said metal surface.

* * * * *